United States Patent Office 2,924,576
Patented Feb. 9, 1960

2,924,576

RADIO-ACTIVE DECONTAMINANT

Frederick C. Bersworth, Framingham Center, Mass., and Martin Rubin, Silver Spring, Md., assignors, by direct and mesne assignments, to The Dow Chemical Company, Midland, Mich., a corporation of Delaware No Drawing. Application September 23, 1954
Serial No. 458,023

7 Claims. (Cl. 252—117)

This invention relates to chemistry and more particularly to a chemical composition of matter which in aqueous solution is suitable for use in the removal of radio-active materials from the surface of animate and inanimate objects.

Another object is to provide a method and means for solubilizing the radio-active metallic constituent of solid phase materials.

Still another object is to provide a decontaminating mixture of materials which in aqueous solution is suitable for washing the surface of animate and inanimate objects to remove the radio-active metallic constituents of solid phase radio-active materials present thereon.

A further object is to provide a decontaminating solution for the removal of radio-active substances from the clothing and skin of animate objects.

Other objects and advantages will be apparent as the invention is more fully hereinafter disclosed.

In accordance with these objects we have discovered that the radio-active metallic constituent of solid phase radio-active materials may be rapidly solubilized by a base exchange reaction with the disodium-calcium salt-complex of ethylene diamine tetraacetic acid and that this salt-complex and the radio-active complex reaction product thereof are both non-toxic to animals and to humans.

Based on this discovery we have devised a composition of matter which in aqueous solution is an excellent decontaminating solution for the removal of radio-active metal ions from solid phase radio-active substances, particularly those in finely divided condition such as dust and powdered material. This composition of matter consists in major part of the disodium-calcium salt complex of ethylene diamine tetraacetic acid and in minor part of the tetra sodium salt of ethylene diamine tetraacetic acid, and may contain, in addition, a small amount of an organic or inorganic detergent compound such as an alkali metal fatty acid soap compound, an alkali metal poly phosphate, and other well known detergents capable of functioning as detergents in alkaline pH solutions.

In this mixture of materials, the main constituent relied on for the removal of the radio-active metal ions present in the finely divided radio-active substances on the surface of the animate or inanimate object, is the disodium-calcium salt-complex of ethylene diamine tetraacetic acid. This salt-complex is known to have the following structural formula:

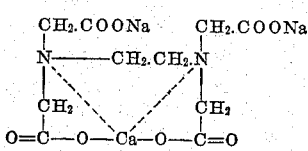

This complex is highly soluble in water and in aqueous solution it has a pH of 6.5 to 7.0. It is stable in alkaline pH solutions. In such alkaline pH solutions, however, the Ca will be displaced from complex combination by almost any metal except alkali metals. Even radio-active calcium 45 will displace calcium 40 from complex combination to an equilibrium percent. Displacement of the calcium from this complex is relatively rapid in the case of metallic ions in aqueous solution and more slowly where the metallic ion is in solid phase dispersion in the solution, the particular rate depending, of course, on the particular metallic compound of the solid phase.

As the normal expectancy in the case of radio-active dust or powder resulting from an atom bomb explosion is against water solubility and in favor of the formation of oxide, silicate and similar water insoluble compounds, a proportion of the tetra sodium salt of ethylene diamine tetra acetic acid is associated with the disodium-calcium complex to function as a wetting and dispersion agent for the radio-active dust particles and to increase the alkalinity of the washing solution to a pH well above the normal pH of the disodium complex so that the presence of acidic compounds in the radio-active dust may be neutralized.

It is believed apparent, therefore, that the relative proportions of the normal tetra sodium salt and the disodium calcium salt-complex of ethylene diamine tetraacetic acid may be widely varied without essential departure from the invention, depending upon circumstances. In general, it is preferred to maintain a relative proportioning of these two constituents in the dry mixture of about 4 to 1, this being calculated to give on aqueous solution a pH of about 9 to 10.5. This approximate pH is calculated as providing the safest margin of safety in the presence of acidic radio-active dust compounds.

Where the known quantity of acidic compounds in the dust is high and is likely to lower the pH of the solution substantially below a pH of 8, the pH of the solution may be fortified or buffered by sodium carbonate or sodium hydroxide, without departure from the invention.

While the normal tetra sodium salt of ethylene diamine tetraacetic acid is an effective wetting and dispersing agent for radio-active inorganic dust particles, in the normal and expected use of the present invention, it is contemplated that the removal of the radio-active dust particle itself from the surface of the animate or inanimate object is of as much primary importance as is the removal of the radio-active metal ion from the particle by base exchange reaction with the disodium-calcium complex and conversion into a water soluble disodium complex which can be drained off from the surface.

In view of this, a small proportion of a detergent compound which is compatible with alkaline pH reaction solution is preferably also incorporated into the mixture to function as a dirt removal agent. Alternatively, the use of soap compounds in association with the reaction solution in the cleaning of any given surface of dust and dirt particles would be equally as effective. However, we have found it best to incorporate a small amount of an inorganic detergent such as an alkali metal poly phosphate in the dry mixture of the disodium-calcium complex and normal tetra sodium salt of ethylene diamine tetraacetic acid to insure the removal of all dirt particles from the surface to be treated. Alkali metal fatty acid soap compounds may thereafter be added to the washing solution, if desired, for increased detergent action.

Of advantage for incorporation with the disodium-calcium complex are the alkali metal poly phosphate detergents which are usually composed of one or more of the compounds sodium pyrophosphate ($Na_4P_2O_7$), sodium tripoly phosphate ($Na_5P_3O_{10}$) and sodium hexametaphosphate ($Na_6P_5O_{16}$). The materials usually are obtained with minor amounts of water of crystallization and they can be incorporated as such with the disodium calcium complex for use as the decontaminating agent. One of their advantages is that they are alkaline materials and materially assist in maintaining the alkalinity of the washing solution at appropriate level in that their composition renders them effective buffering agents.

Of the alkali metal fatty acid soap compounds which are useful, those which represent the usual sodium stearate base soaps, whether in cake or granular form may be used. Typical of these are soaps sold under the trademarks Ivory, Swan, Super Suds and Rinso.

As one specific embodiment of the present invention but not as a limitation thereof, the present invention contemplates the provision of a decontaminating mixture consisting of about 80% the disodium-calcium complex and about 20% the normal tetrasodium salt of ethylene diamine tetraacetic acid, based on the weight of the two ingredients to which is added about 10% (based on the total weight) of the inorganic detergent sodium polyphosphate.

The relative proportions of the disodium-calcium complex and the normal tetra salt may vary widely from this preferred proportion without departure from the invention, although in view of the toxic nature of the normal tetra salt it is preferable to lower the amount of this salt in the mixture to 10% when the solution is to be applied to the surface of animate objects such as animals and humans. Experiments have shown that the disodium-calcium complex and the tetra sodium salt are each readily absorbed by the skin of animals and humans. The disodium-calcium complex can be tolerated in relatively large amounts in the animal or human system and although it functions in the system as a demetallizing agent the great solubility of the calcium complex and its rapid removal from the system by the excreted body fluids precludes very lasting effect from the amount absorbed through the skin surface on washing the surface. On the other hand, the tetra sodium salt, being strongly acidic is sometimes irritating to the skin and on absorption into the blood stream becomes an active complexing agent for metal ions present in the blood stream rapidly demetallizing the blood stream of calcium and other essential metal ions. The lowering of the normal calcium and other metal ion levels in the blood stream can cause considerable bad reactons and the danger of such bad reactions therefore should be reduced to the lowest possible level. This danger is not reduced by mere dilution of the washing solution as the chemical activity of these compounds increase with increase in dilution. Accordingly, for use as a decontaminating solution for animals and humans where it is brought into contact with the skin, it is preferred to employ a mixture of materials which on a dry weight basis contains not over 10% of the normal tetra salt and preferably as low as 5%. With this solution also it is preferred to employ alkali metal fatty acid soap compounds or other detergent compounds to facilitate the ready removal of all radio-active dust and dirt particles from the skin surface as rapidly as possible and to follow up the washing operation with copious rinsing in clear water with or without further soaping.

As a specific embodiment of the use and utility of the present invention, in the cleaning of inanimate surfaces of radio-active dust and dirt particles, the above disclosed preferred mixture of sodium-calcium complex, normal tetra salt and polyphosphate may be employed direct with or without the use of additional amounts of detergent compounds to facilitate the removal of the radio-active dust and dirt from the inanimate surface. As an example, the solution may be used, in any dilution, but preferably diluted to an extent of about one part of the mixture (by weight) to 50 to 200 parts of water, in the scrubbing of metal, wood, or concrete surfaces, with or without additional soap compounds. Subsequent flushing of the cleaned surface with clear water provides a decontaminated surface with the radio-active dust and dirt particles flushed down into a sewer drain.

In the washing of clothes or fabrics for the removal of radio-active dust and dirt particles therefrom, it normally is sufficient to add to the usual alkali metal fatty acid soap or other alkaline pH detergent washing solution, a small amount of the above disclosed preferred mixture and thereafter to process the clothes precisely in accordance with prior art laundry practice. The particular amount of the mixture added to any given washing solution may vary widely depending upon the amount of radio-active dust and dirt particles to be removed and the quantity of clothes treated. As the major object in the use of the mixture of the present invention is to convert the radio-active dust and dirt particles to a water soluble complex which can be disposed of down the drain and dispersed widely in a large volume of water, it is preferred to wash the clothes first in a 20% solution of the mixture, using sufficient additional soap compounds to insure the removal of the radio-active dirt particles from the clothes and its dispersion in the decontaminating solution. After thorough rinsing of the decontaminating solution from the clothes, a second washing in the usual laundry detergent solution containing about 5% to 10% (by weight) of the mixture of the present invention will effectively remove the last traces of radio-active dirt and dust particels from the clothes. Thorough rinsing of the clothes in clear water thereafter, before drying, is all that is required.

In the bathing of the skin areas to remove radio-active dust and dirt particles, a lathering detergent solution containing 5% to 10% (by weight) of the mixture of the present invention with not over 10% of the mixture consisting of the normal tetra sodium salt, should be used and the time of contact of the solution with the skin area should be reduced to the minimum. A succession of relatively rapid washings with the soap solution with intervening rinsing with clear water is preferred to a thorough extended washing in the soap solution for reasons explained above.

Typical formulations described herein are the following:

Example I

| | Parts |
|---|---|
| Disodium calcium complex [1] | 4 |
| Tetra sodium salt [2] | 1 |

Example II

| | |
|---|---|
| Disodium calcium complex [1] | 4 |
| Trisodium salt [2] | 1 |

Example III

| | |
|---|---|
| Disodium-calcium complex [1] | 4 |
| Tetra sodium salt [2] | 1 |
| Sodium polyphosphate (sodium pyrophosphate, sodium tripolyphosphate or sodium phosphate or any mixture thereof) | ½ |

Example IV

| | |
|---|---|
| Disodium-calcium complex [1] | 4 |
| Tetra sodium salt [2] | ½ |
| Alkali metal soap (ordinary sodium toilet soap or granulated soap) [3] | 1 |

[1] Disodium-calcium complex of ethylene diamine tetra acetic acid; or calcium complex of other amino acids noted.
[2] Tetra sodium salt or tri sodium salt of ethylene diamine tetra acetic acid; or corresponding alkali metal salt of other amino acids noted.
[3] Usual commercial soaps, preferably in granulated form.

In substitution for ethylene diamine tetra acetic acid in the above Na.Ca chelate compound we may employ a number of other poly amino poly carboxylic acids such as trimethylene diamino tetra acetic acid, cyclohexyl diamino tetraacetic acid, propylene diamine tetraacetic acid, diethylene triamine penta acetic acid, mono benzyl ethylene diamine triacetic acid and other synthetic polyamino poly acetic acids, all of which form similar chelate compounds which function similarly to the Na.Ca chelate compound above described as a base exchange agent and by the term ethylene diamine as hereinafter used in the claims these equivalent amino acids are meant to be included.

In place of the tetra sodium salt of ethylene diamine tetra acetic acid in the above mixture of materials many other metal ion sequestering agents also may be employed and especially the sodium salts of any one of the substituent polyamino polycarboxylic acids above identified.

In the claims, the word "sodium" is meant to include potassium, ammonium and amine salts of ethylene diamine tetra acetic acid. For purposes of the present invention these salts may be employed in part or in whole substitution for the normal tetra sodium salt and the sodium-calcium complex without substantial change or alteration in the specific proportions given.

This application is a continuation-in-part of application Serial No. 216,260, now abandoned.

From the above disclosure of the present invention it is believed that one skilled in the art will recognize that the same may be widely varied without essential departure therefrom to meet a plurality of existing conditions and all modifications and adaptations of the invention are contemplated as may fall within the scope of the accompanying claims.

What is claimed is:

1. A composition of matter for cleansing surfaces carrying water insoluble metallic residues, consisting essentially of a mixture of about 4 parts by weight of disodium salt of the calcium complex of an ethylenediamine polyacetic acid chelating agent and 1 part of the normal sodium salt of the same amino acid, said mixture in aqueous solution having a pH within the range from about 9 to about 10.5.

2. A composition of matter consisting essentially of about 4 parts by weight of the disodium salt of the calcium complex of ethylenediaminetetraacetic acid and about 1 part of the normal sodium salt of ethylenediaminetetraacetic acid, said mixture in aqueous solution having a pH of about 9 to about 10.5.

3. The composition of claim 2 blended with approximately 10 percent, based on the total weight of both constituents, of a sodium phosphate selected from the group consisting of tetrasodium pyrophosphate, sodium tripolyphosphate and sodium hexametaphosphate.

4. An aqueous washing solution for the removal of radio-active dust and dirt particles from the surfaces of animate and inanimate objects, consisting essentially of water and about 20 percent of the mixture consisting of the disodium salt of the calcium complex of an ethylenediamine polyacetic acid and the normal sodium salt of said same amino acid, the ratio of the calcium complex to the normal salt being about 4 to 1.

5. The washing solution of claim 4, said solution also containing approximately 10 percent of a water-soluble alkali metal fatty acid soap.

6. An aqueous washing solution for cleaning radio-active dust and dirt particles from the surfaces of animate objects, consisting essentially of water, a water-soluble alkali metal fatty acid soap and about 10 percent to about 20 percent of a mixture consisting of 90 percent disodium salt of the calcium complex of ethylenediaminetetraacetic acid and up to 10 percent of the tetra sodium salt of said acid.

7. The solution of claim 6, said mixture also containing about 10 percent, based on the weight of said mixture of materials, of a sodium phosphate selected from the group consisting of tetrasodium pyrophosphate, sodium tripolyphosphate and sodium hexametaphosphate.

References Cited in the file of this patent

UNITED STATES PATENTS 2,474,412    Bersworth -------------- June 28, 1949

OTHER REFERENCES

The Modern Chelating Agent—Versene; Bersworth Chem. Co., 1949, Tech. Bull. No. 1, pages 5, 10 and 11.

The Effects of Atomic Weapons, Supt. of Documents, D.C., September 1950, page 328.